Patented Mar. 11, 1930

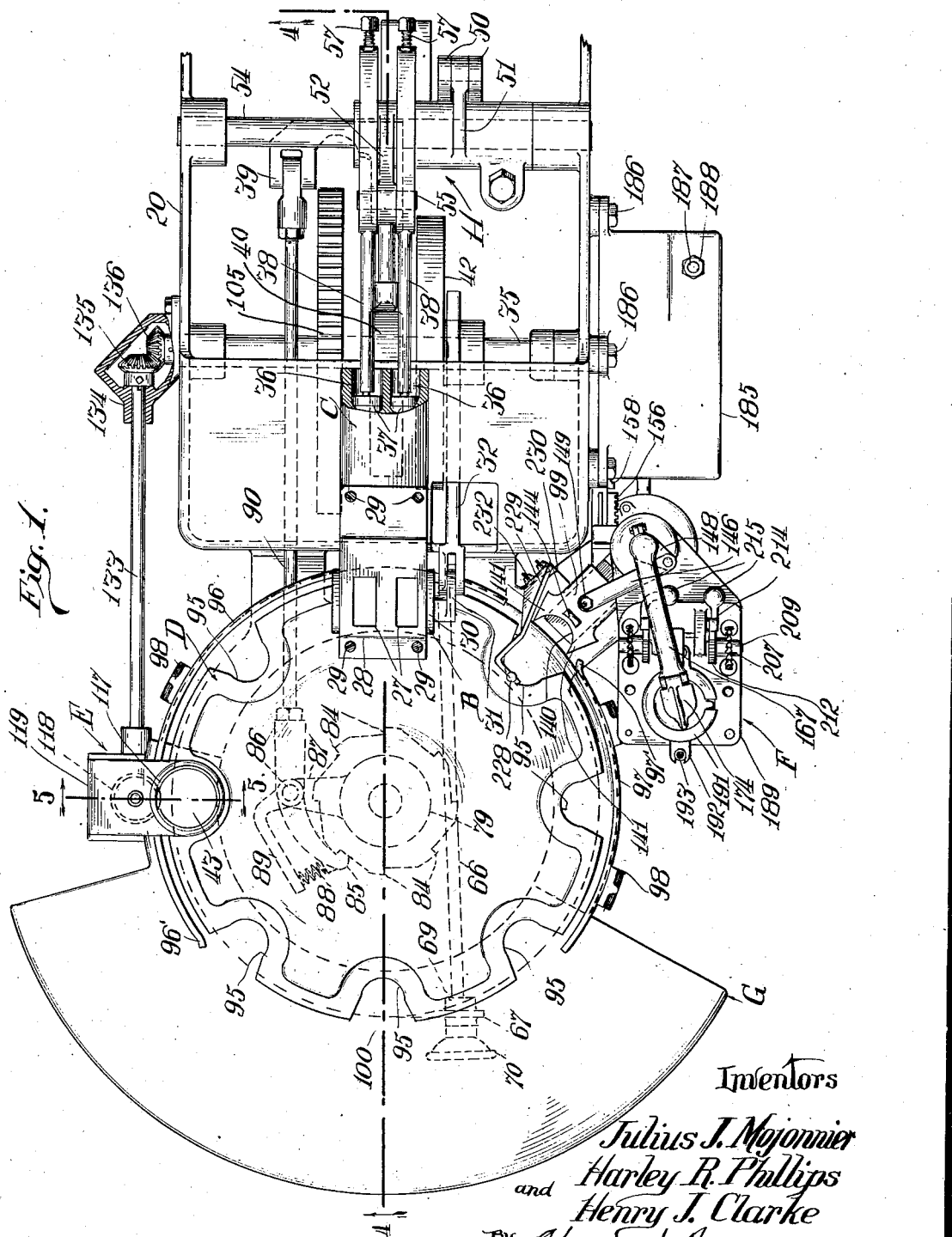

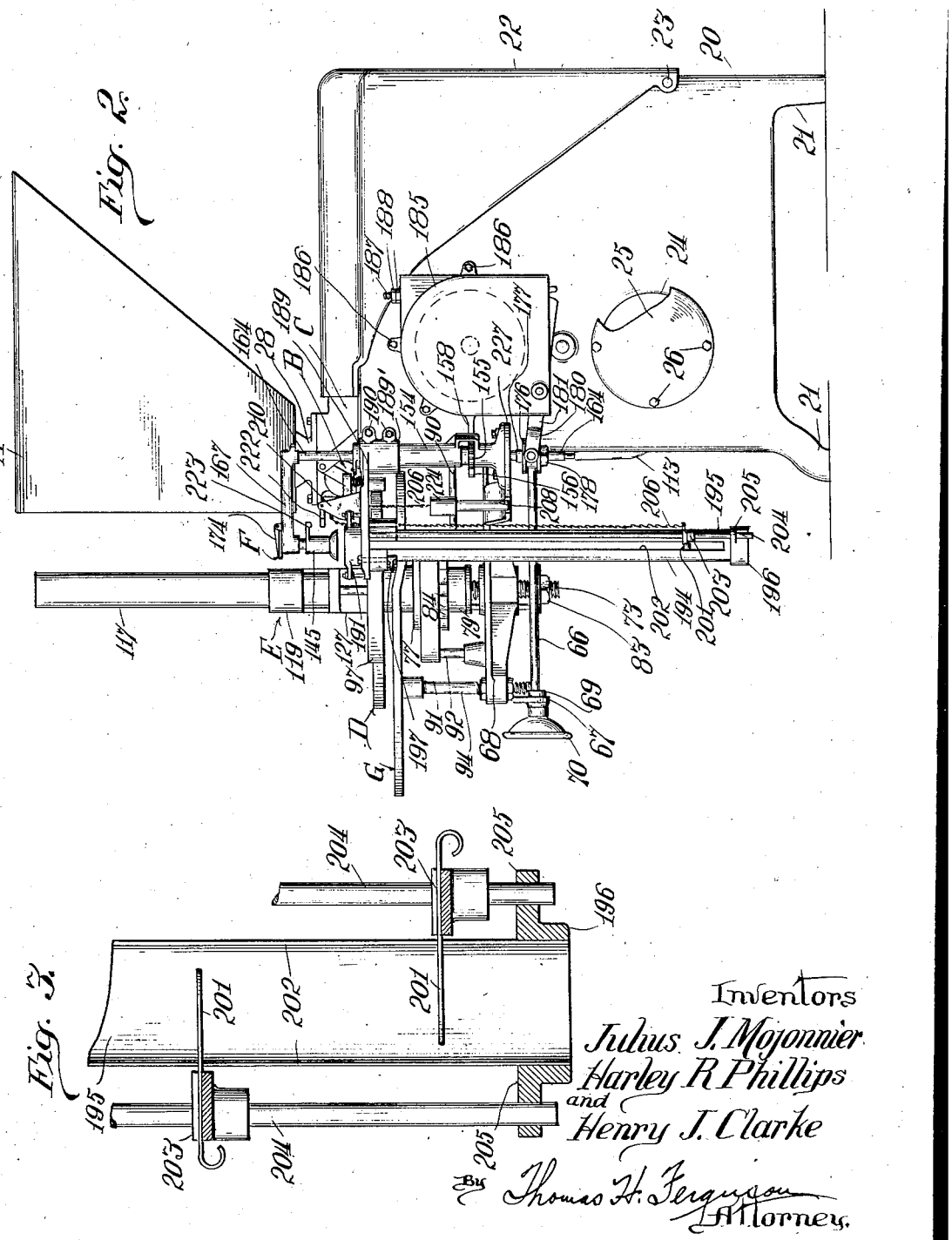

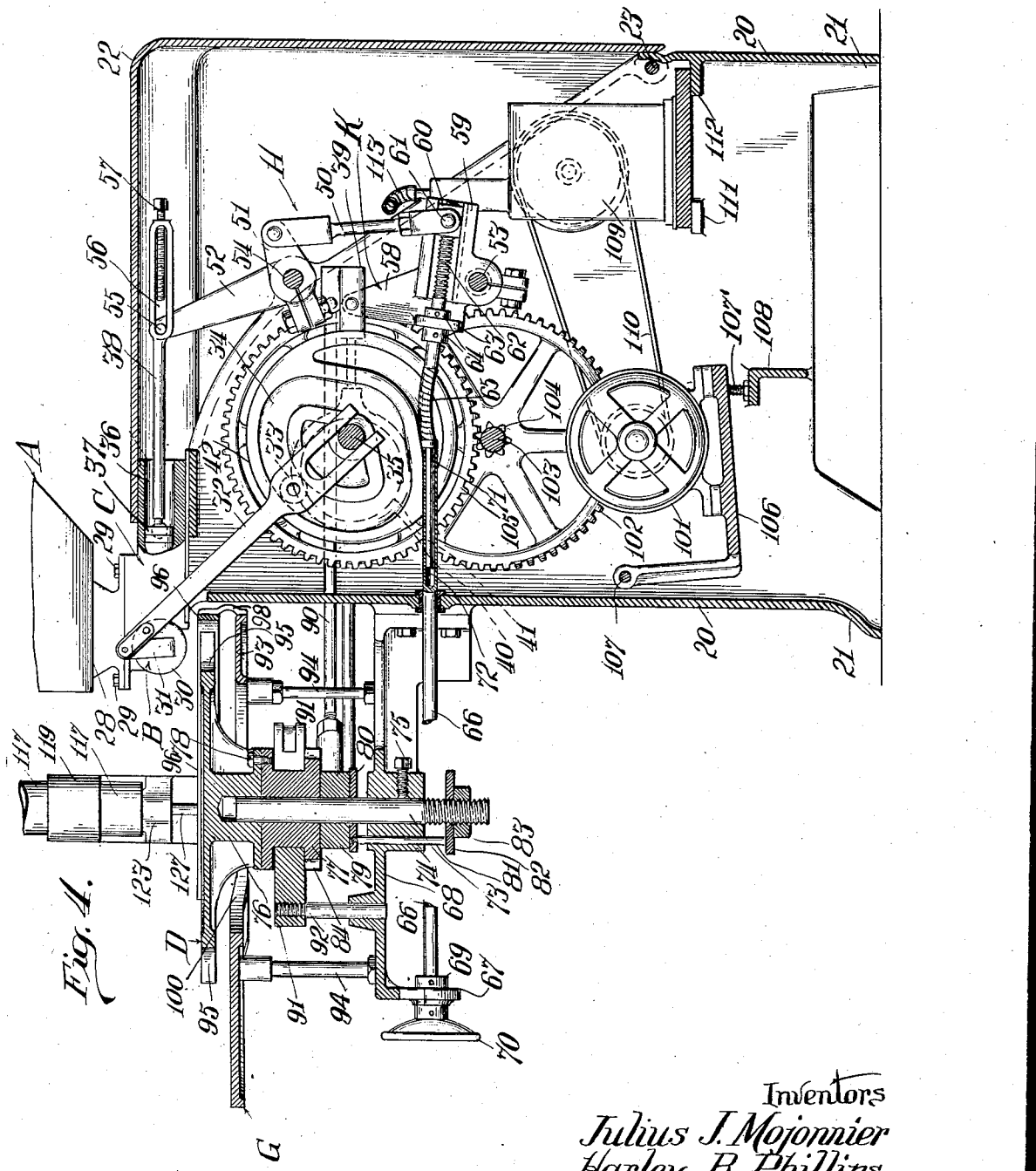

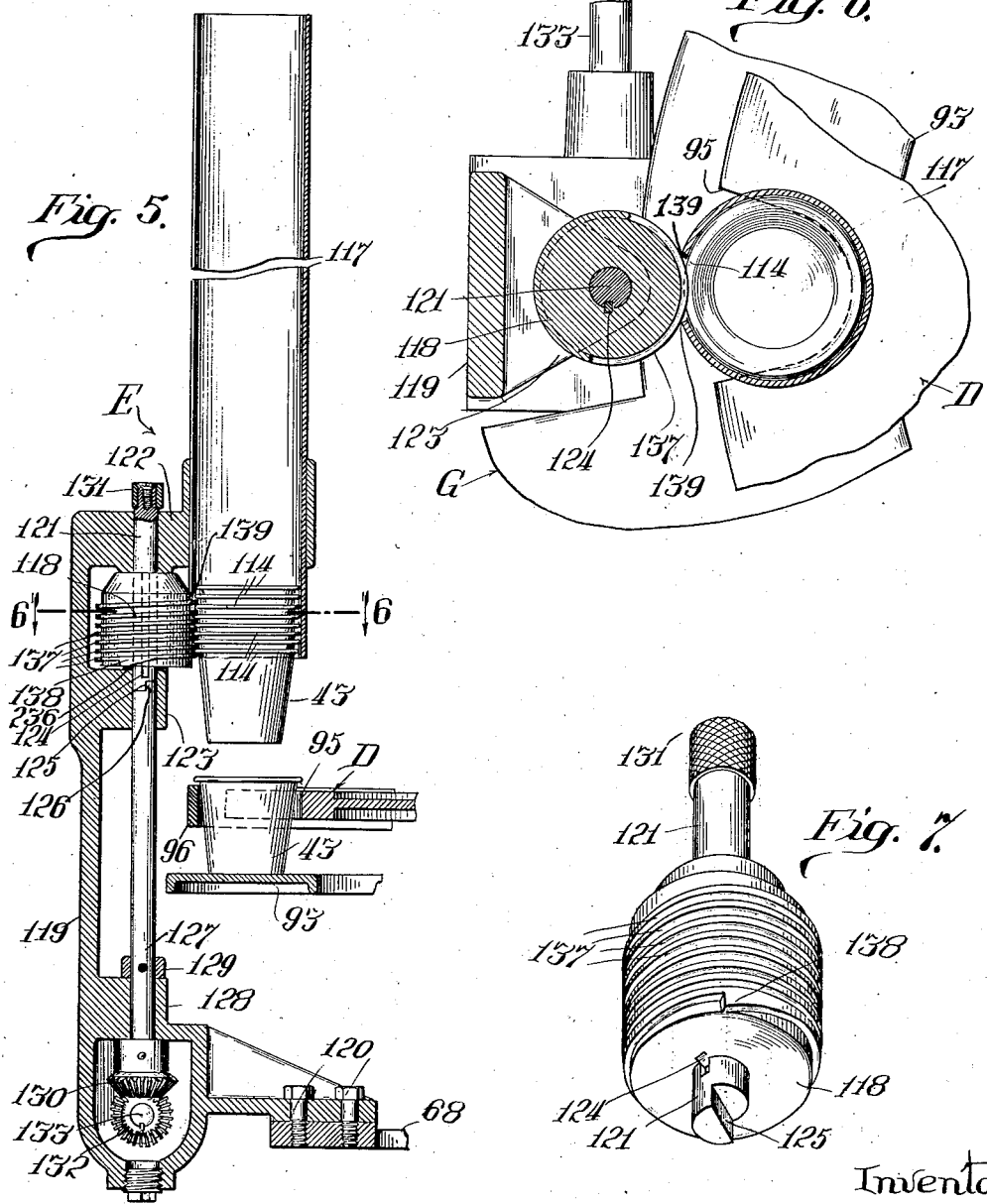

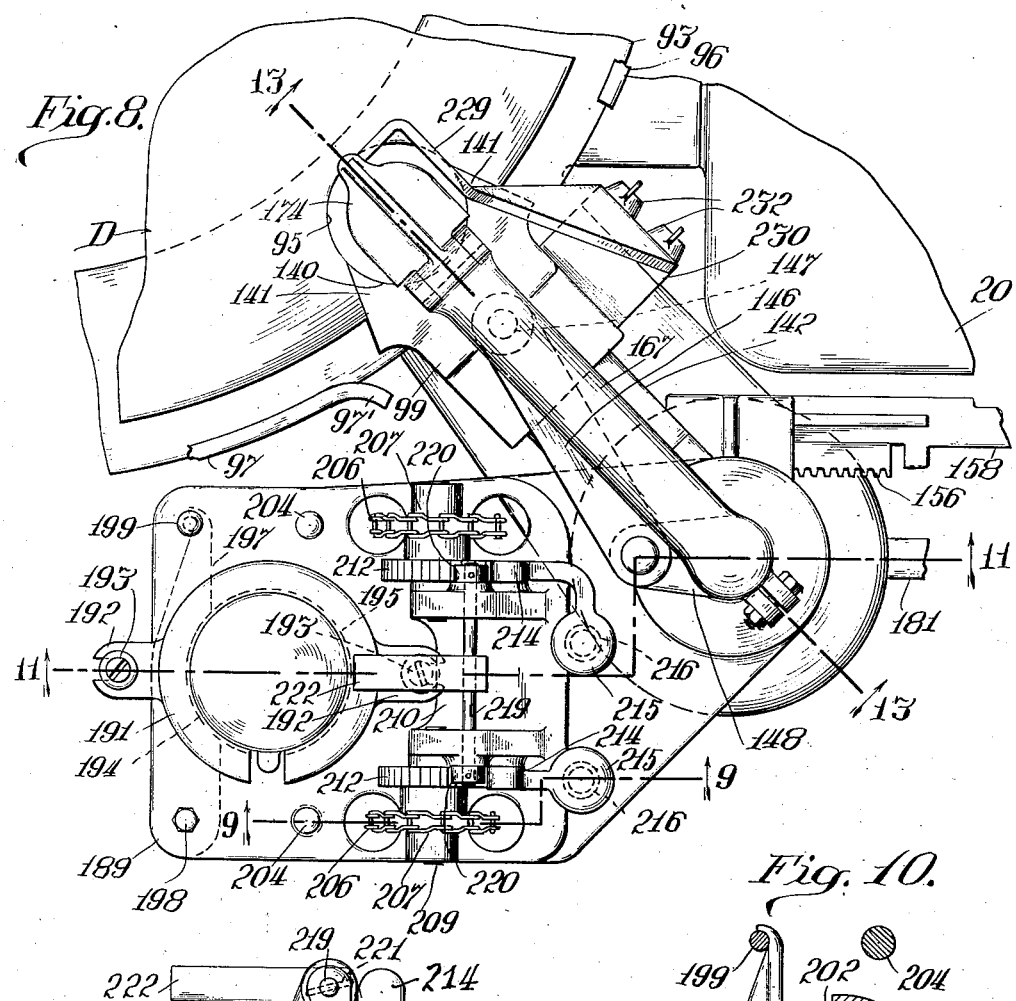
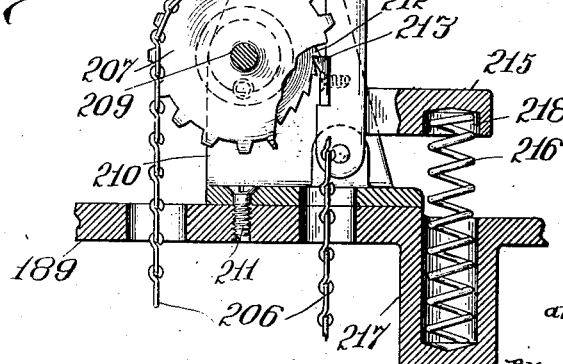
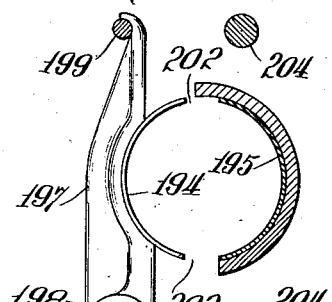

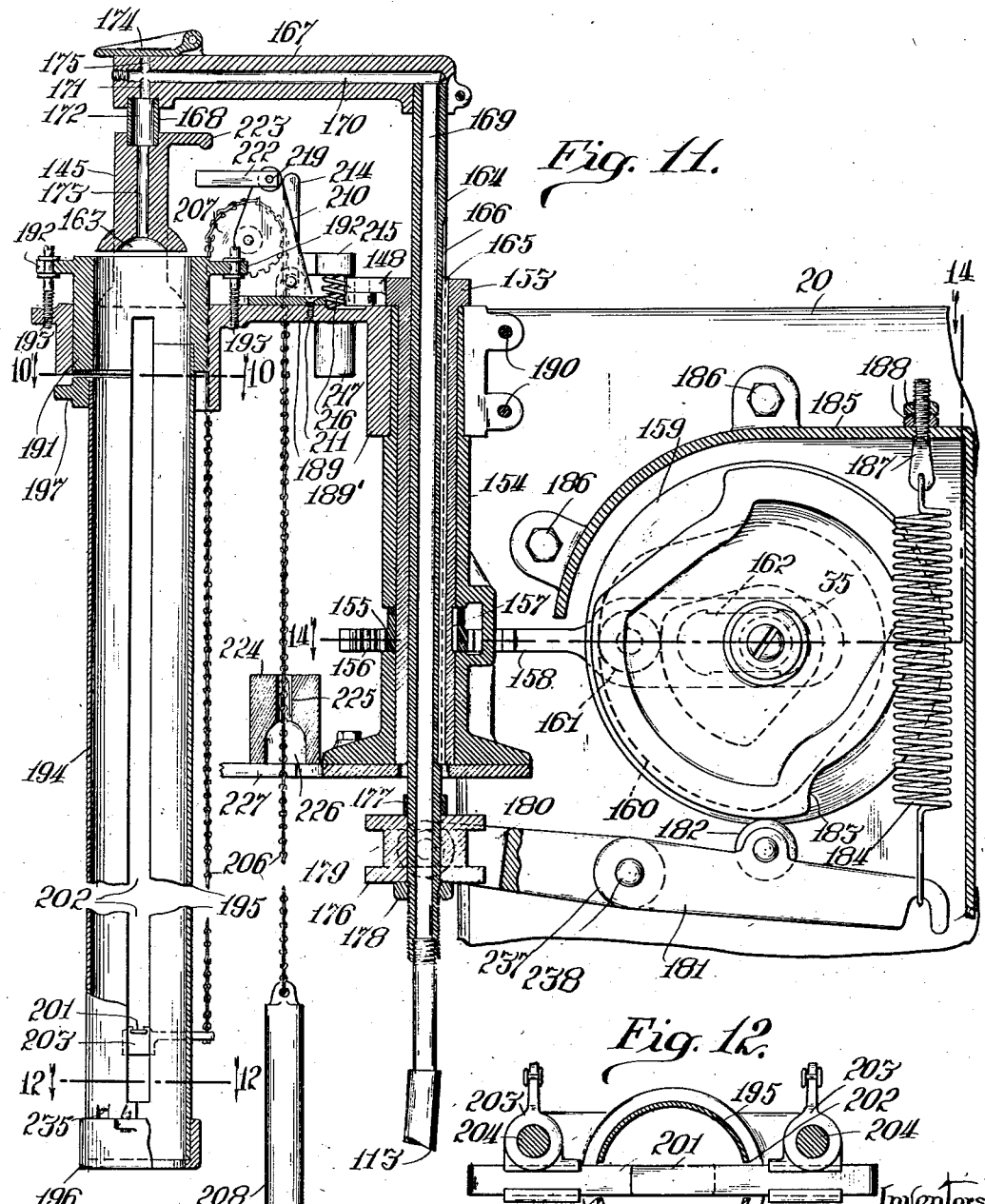

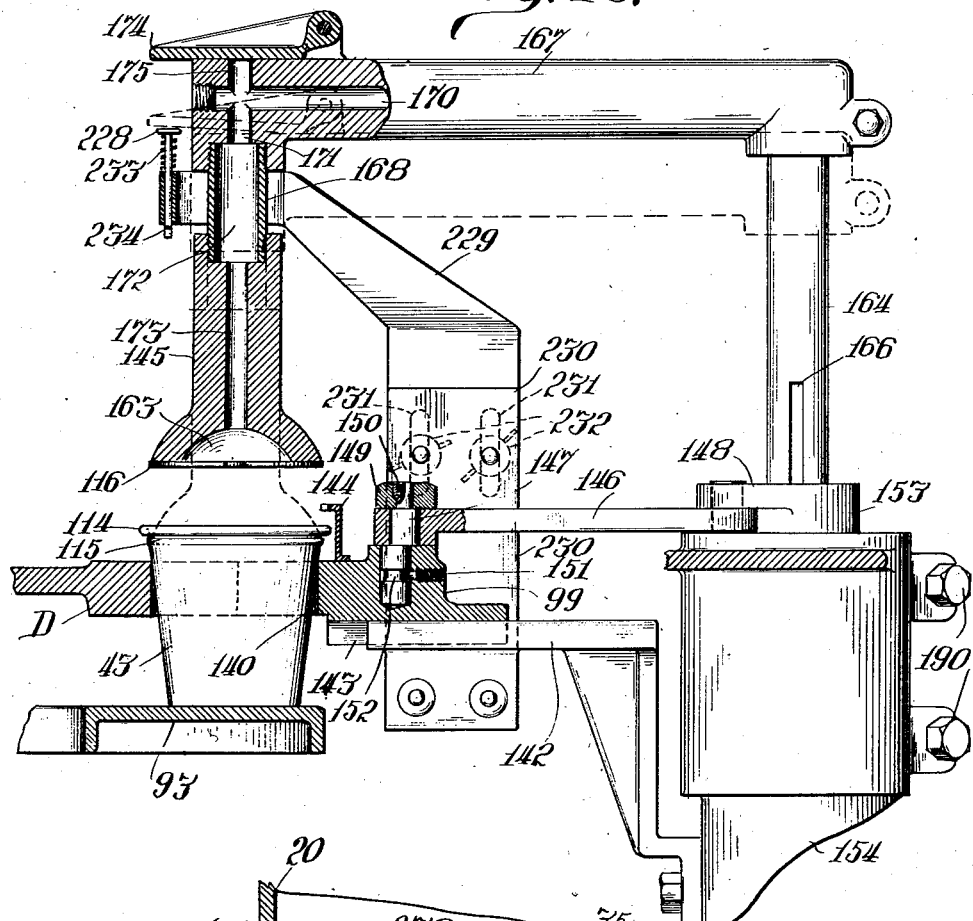

1,750,419

UNITED STATES PATENT OFFICE

JULIUS J. MOJONNIER AND HARLEY R. PHILLIPS, OF OAK PARK, AND HENRY J. CLARKE, OF CHICAGO, ILLINOIS, ASSIGNORS TO MOJONNIER BROS. CO., A CORPORATION OF ILLINOIS

CAPPING MECHANISM

Application filed August 17, 1926. Serial No. 129,700.

This invention relates to capping mechanisms generally and more particularly to capping mechanisms for use in packaging machines wherein relatively fragile containers of paper or other fibrous material are capped after being filled with ice creams, sherbets, water-ices, pomades, pastes, and like plastic substances.

Recently there has developed a considerable trade in ice creams, water ices, and like edible commodities wherein a certain serving is given to the customer in a covered container, preferably a fragile container which may be destroyed after the customer has finished with it. In practice these containers are filled and capped at the ice cream factory and placed in ice cooled tubs which are sent to the place of retailing. At the latter the containers are removed individually from the tubs and the contents served to the customers.

The various features of the present invention are embodied in a machine devised more particularly for this class of service. They, however, need not be restricted to the packaging of edible commodities, since the same are capable of application to other uses. However, in the present instance the features of the invention will be set forth as embodied in a machine for handling edible commodities.

The packaging machine herein disclosed is along the lines of that shown in United States Patent No. 1,502,314, dated July 22, 1924, and of that shown and described in the sole application of Julius J. Mojonnier Serial No. 75,953, filed December 17, 1925.

In brief, the machine disclosed herein comprises a conveyor for carrying the containers, a feeder for placing the containers one by one upon the conveyor, a filler for supplying the commodity to the containers as they successively appear before it, the capping mechanism, constituting the invention claimed herein, for applying caps or other closures to the filled containers, and mechanism for operating these elements in proper relation one to the other.

The pneumatic capping or closure applying mechanism embodies several novel features. One of these is novel means for applying a variable pressure to the articles being worked upon, which articles may be caps in the form of flat disks, covers, or other articles capable of being stacked. Other features are the novel arrangements of parts by which the cup is given vertical and rotary movements, the former in its receiving and delivering position, and the latter to carry it back and forth between those positions. We also provide a new form of multiple feed which insures a steady and continuous feed or articles from a stack even while more articles are being added to the stack. We also provide a novel holder construction by which stacked articles in a carton may be readily removed by inserting a portion of the holder into the carton, and then the removed portion with the articles upon it is placed in the machine in operative relation to the other parts.

The stacked articles, as just indicated, may be of a large variety, and in some instances it may be necessary to modify the pneumatic cup construction to suit these articles, but it will be clear that the pneumatic mechanism herein disclosed may be readily adapted to the transfer of different articles. Even where slight modifications are necessary, the main features of the structure may be retained.

These several features of our invention with their advantages will be more fully understood upon reference to the following detailed description taken in connection with the accompanying drawings, while the scope of the invention will be particularly pointed out in the appended claims.

In said drawings, Fig. 1 is a plan view of a packaging machine having therein capping mechanism constructed in accordance with the present invention, the supply hopper being omitted for clearness; Fig. 2 is a side elevation of the machine; Fig. 3 is a vertical section through the lower end of the holder of the capping mechanism; Fig. 4 is a vertical section of the machine taken on a plane indicated by the line 4—4 of Fig. 1, certain parts being shown in elevation; Fig. 5 is a vertical section through the container feeder and a portion of the adjacent rotary conveying member, the plane of section being indicated by the line 5—5 of Fig. 1; Fig. 6 is a horizontal section of the same, taken on a plane indicated by the line 6—6 of Fig. 5; Fig. 7 is a perspective view of the screw member and supporting shaft of the container feeder; Fig. 8 is a plan view of the capping mechanism and associated parts; Fig. 9 is a vertical section through the capping mechanism, taken on a plane indicated by the line 9—9 of Fig. 8, illustrating more particularly the control mechanism by which a regulated pressure is applied to the stacked articles in the holder of the mechanism; Fig. 10 is a horizontal section of the upper end of the holder, the plane of section being indicated by the line 10—10 of Fig. 11; Fig. 11 is a vertical section through the capping mechanism, the plane of section being indicated by the line 11—11 of Fig. 8; Fig. 12 is a horizontal section through the holder near its bottom, taken on a plane indicated by the line 12—12 of Fig. 11; Fig. 13 is a vertical section through the same mechanism and adjacent machine parts, the plane of section being indicated by the line 13—13 of Fig. 8; and Fig. 14 is a horizontal section through the same mechanism taken on a plane indicated by the line 14—14 of Fig. 11. Throughout these views like characters refer to like parts.

In general, the machine illustrated in the drawings comprises a main hopper A for holding the supply of the commodity to be filled into the containers, a valve B by which the commodity is led from the hopper to the cylinder or cylinders and then from the latter to the containers, C the cylinder block whether containing one or more cylinders, D the rotary conveying member which carries the containers to the proper operating positions, E the container feeder by which the containers are fed from a supply column into proper position upon the conveyor, F the pneumatic capping or closure applying mechanism (the invention herein claimed) by which the containers are sealed, and G a receiving table upon which the filled and closed containers are delivered for subsequent removal by an attendant.

Referring to the drawings in detail, it will be seen that these various parts are positioned upon a main frame 20, having a plurality of supporting legs 21. The frame 20 is provided with a cover 22 which is pivoted at the point 23 to the frame 20. The frame 20 and its cover 22 forms a box like structure which is in reality a casing for the motor, gearing, and other movable parts of the machine. By turning down the cover 22 access may be had to the various parts enclosed in the casing. Obviously, other openings may be provided such as the hand hole 24, shown more particularly in Fig. 2. This may be closed by a suitable hand hole cover 25. Bolts 26 with the usual nuts may be used for this purpose.

The hopper A is located, as is usual in machines of this class, directly above the valve B. It need not be described in detail as it may be practically the same in construction as the hopper shown in the aforesaid Patent, No. 1,502,314. In this instance, however, it has different dimensions and is provided with a single partition so as to take care of two flavors of ice cream, if that be the commodity handled. This is indicated by the presence in Fig. 1 of two outlets 27 through which the hopper contents pass on their way to the cylinders in the block C. The openings 27 are in a block 28 which forms the lowermost member of the hopper A. This block is secured to the cylinder block C by any suitable means such as the screw bolts 29. Obviously, the openings 27 in the block 28 register with similar openings having access to the valve B.

The valve B comprises a rotary member 30 which fits into a bore extending crosswise of the forward end of the cylinder block C. The member 30 is provided with suitable passages which cooperate with passages in the cylinder block to guide the material from the hopper A to the cylinders in one position of the valve, and from the cylinders to a discharge point directly beneath the valve in the alternate position of the valve. The arrangement is similar to that shown by the valve of patent to Geyer No. 1,401,150, dated December 27, 1921, and also to that shown by the valve in the aforesaid application of Julius J. Mojonnier, Serial No. 75,953. It therefore need not be more fully disclosed herein. One end of the rotary valve member 30 is provided with a crank arm 31 which is connected at its outer end with an actuating rod 32, driven through the agency of a cam roller 33 and cam track 34 upon the cam member 42 keyed to the cam shaft 35 journaled in the side walls of the main frame 20, as clearly illustrated in Fig. 1. The rod 32 is bifurcated at the cam end and the bifurcations straddle the shaft 35 and in this way the rod 32 is guided in its reciprocations. The cam member 42 is provided on one side with the cam 34 and on the opposite side with an eccentric 41. The cam track 34, as clearly shown in Fig. 4, is a depressed track.

The cylinder block C is bored out to provide, in the present instance, two cylindrical chambers 36. In each of these is a piston 37 having a piston rod 38. For the purpose of actuating the piston rods 38 we employ lever and link mechanism H which acts between a reciprocating driving head 39 and the rods 38. The head 39 is provided with an eccentric band 40 shown in dotted lines in Fig. 4, and the latter encircles an eccentric 41, also shown in dotted lines in said Fig. 4. The eccentric 41 is mounted upon cam shaft 35 so as to rotate with it. As a result of this construction, the rotation of the eccentric 41 reciprocates the driving member 39 to and fro. The reciprocating movements of the head 39 are communicated to a bell crank lever K which has its short arm connected by a link 50 with the short arm 51 of a second bell crank lever, the long arm 52 of which is connected to the piston rods 38. The bell crank K is mounted for oscillation upon a transverse shaft 53 which is journaled at its ends in bearings in the side walls of the main frame 20. In like manner, the upper bell crank lever is secured to a shaft 54 which is similarly journaled in the side walls of the frame 20. The upper end of the bell crank arm 52 is provided with a transverse pin 55 which extends into slots 56 formed in the outer ends of the piston rods 38. The pin 55 has a limited movement in the slots 56 regulated in each instance by an adjusting screw 57 which is threaded through a threaded opening in the outer end of the rod 38 in each instance. By means of these screws 57 the movement of the pistons 37 may be regulated with reference to the throw of the crank arm 52. This is an adjustment which will be made when the parts are at rest.

The bell crank lever K includes a member 58 which constitutes the long arm of the bell crank. This member is secured at its upper end to the reciprocating head 39. At its lower end it is provided with a slotted head 59 in which an adjusting block 60 may be moved. The lower end of the link 50, which connects the two bell crank levers, is journaled on a pin 61 which extends outward from the block 60. By means of the adjustable block 60 it is possible to vary the length of the short arm of the bell crank lever, that length being the distance between centers of the pin 61 and the shaft 53. By this adjustment the throw given to the arm 52 and the piston rods 38 may be varied.

The adjustment of the block 60 along the guideway of the head 59 may be accomplished in any preferred way. Preferably this should be attainable while the machine is in operation. We have devised an arrangement by which this result may be accomplished. To this end we provide a threaded bore through the block 60 and into this threaded bore extends a screw 62 which is journaled for rotation in a lug 63 formed on the longer bell crank member 58. Collars 64 fixed to the screw 62 on opposite sides of the lug 63 hold the screw against longitudinal movement. In order to turn the screw 62 while the parts are in motion we preferably connect the forward end of the screw to a piece of flexible shafting 65. The other end of this shafting is telescopically connected to the rear end of a rotary adjusting rod 66 which is journaled in the forward wall of the casing 20 and in a downward projection 67 from the forward end of a bracket 68 upon the forward wall of the casing 20.

A collar 69 is secured to the rod 66 and cooperates with the hub of the hand wheel 70 to prevent longitudinal movement of the rod 66 while leaving it free to rotate. It will be seen that with this construction it is possible by turning the hand wheel 70 to rotate the screw 62 and thus move the block 60 along the slotted guideway in the head 59 and thus vary the length of the short arm of the bell crank lever K. Thus a means for adjusting the throw of the pistons 37 while the machine is in operation is provided. The telescopic connection between the rod 66 and the flexible shaft 65 is provided by securing the forward end of the flexible shaft to a square rod 71 which enters a square bore 72 in the rear end of the adjusting rod 66. The connection furnished by these parts allows the bell crank K to be oscillated to and fro without at any time interfering with the control of the rod 66 over the screw 62.

It will be seen from the description thus far given that each to and fro movement of the driving head 39 produces a to and fro movement of the pistons 37. Such movement corresponds to one rotation of the cam shaft 35. The same rotation causes the valve B to move to its alternate positions. This means that as the pistons 37 recede, the valve B is in position to guide charges of the commodity into the cylinders. The action of the pistons is to draw in charges of the commodity thus available. The return movement of the pistons to discharge the commodity from the cylinders does not occur until after the valve B has been thrown to its alternate or discharge position.

The rotary conveying member D is mounted for rotation upon the upper end of a fixed vertical shaft 73 which is firmly secured in a boss 74 in the bracket 68 by any suitable means such as the set screw 75. The table D is provided at its center with a hub 76 which is secured to a braking drum 77 by any suitable means such as the screws 78. The drum 77 in turn rests upon a rocking member 79. The parts 76, 77 and 79 are mounted for rotation upon the shaft 73. They may be adjusted vertically through the agency of a plate or washer 80 which bears against the under side of the member 79. This plate 80 is provided with three or more rods 81 which extend down through openings in the boss 74 of the bracket 68. The lower ends of these rods 81 engage the upper face of a plate or washer 82 which also surrounds the shaft 73. A nut 83 may be screwed up or down upon the end of the shaft 73 to shift the plate 82 and thereby through the pins 81 shift the plate 80. The latter will in turn raise the parts above it or allow them to descend according to the movements of the nut 83. The means thus provided constitutes an adjusting means for the table D by which its position may be raised or lowered. The lower part of the braking drum 77 constitutes a ratchet wheel for rotating the table D. Its teeth 84 cooperate with a driving pawl 85 which is pivotally mounted upon a pin 86 at the outer end of the arm 87 of the rocking member 79. The free end of the pawl 85 is normally pressed into tooth engaging position by a spring 88 which bears between it and a fixed arm 89 carried by the arm 87. The pin 86 which carries the pawl 85 is secured to the forward end of an actuating rod 90 which is pivotally secured at its rear end to the reciprocating head 39. With this construction the reciprocations of the head 39 cause the driving pawl 85 to advance and recede each time stepping the table D forward one step. This step by step mechanism for advancing the table D is practically the same as that disclosed in the aforesaid Patent No. 1,502,314, and need not be described or illustrated in more detail. The same is also true of the braking mechanism by which the table D is kept from advancing more than one step each time the pawl 85 is reciprocated. This braking mechanism places a drag on the table D and prevents its overstepping. For this purpose the drum 77 is provided with a brake band 91 which bears upon the periphery of the drum 77. At one point the brake band 91 is fixed to an upright pin 92 projecting upward from the bracket 68 to which it is fixed.

Beneath the rotary table D is a peripheral plate 93 which is widened out at the forward side of the machine to form the table G. The plate 93 is supported at a plurality of points by legs or rods 94 which are secured to the under side of the plate 93 and table G on the one hand, and on the other hand to the top of the bracket 68. The outer edge of the table D is provided with a series of recesses 95. These are made large enough to fit around a considerable portion of the periphery of the containers that are to be used on the machine. Such containers are generally designated 43 in the drawings. The portion of the table D adjacent to the recesses 95 is thickened so as to provide a substantial wall for the containers 43 to rest against. In order to keep the containers in snug engagement with the walls of the recesses 95, while they are passing from the feeder E to the closure applying mechanism F, we provide a peripheral guard which in the present instance comprises a section 96 and a section 97. The ends of these sections which are first engaged by the containers are turned outward slightly as at 96' and 97' so as to readily engage and properly guide the containers. The sections of the guide are supported from the plate 93 by suitable uprights 98. The guard is divided into segments 96 and 97 in order to leave a gap for the clamping member 99 of the capping mechanism F. It will be noted that the guide sections 96 and 97 maintain the containers in the recesses 95 from the time they are received from the feeder E until after the capping mechanism F has operated. After passing the latter mechanism, the containers are free to move out of the recesses 95 on to the table G. As clearly shown at the point 100 in Fig. 4, the plate 93 merges into the table G by an upward bend. Since the bottoms of the containers slide along the plate 93 as they travel under the impetus of the table D, it will be seen that this high elevation of the table G tends to lift them upward with reference to the engaging walls of the recesses and thus to free them for outward movement upon the surface of the table G as the conveying member D continues its rotation.

The cam shaft 35 is connected by a train of gearing with a driving motor 101. A pinion on the latter engages a large gear wheel 102 which is mounted on a transverse shaft 103, having bearings at its opposite ends in the side walls of the casing 20. A pinion 104 movable with the gear wheel 102 engages a gear wheel 105 which is keyed directly to the cam shaft 35. By this gearing, the speed of the motor 101 is properly reduced to that required for the cam shaft 35. The motor 101 is preferably mounted for adjustment upon a table 106 which is carried by a pivot pin 107 suitably supported by the walls of the casing 20. The free end of the table 106 is vertically adjustable by one or more adjusting screws 107' which extend through the horizontal flange of a transverse angular member 108 carried by the casing 20. By this adjustment the teeth of the pinion of the motor are brought into proper engagement with the teeth on the gear wheel 102. This adjustment enables a ready assembly of motors of different makes in the production of a number of different packaging machines. In this way variations in manufacture are readily taken care of. In addition to driving the cam shaft 35, the motor 101 also drives a pump 109 through the agency of a belt 110. The pump 109 is suitably supported upon members 111, 112, carried by the casing 20. The pump 109 may be of any suitable construction, and it is intended for providing a vacuum for the pneumatic mechanism F. The vacuum connection is provided by a flexible tube 113.

The containers 43 are preferably in the form of cups having outwardly extending rims 114. The material of the cups is fragile, usually being paper waxed or otherwise treated for the purpose of being impervious to the moisture of the commodity, whether it be a frozen dairy product such as an ice cream, or an unfrozen moist substance. Each container 43 is provided just below its rims 114 with a bead 115 which provides an inner peripheral recess for engagement of the closures which in the instance illustrated are disks or caps 116. These are forced into the open ends of the cups until the disk in each instance comes into the recess formed by the bead 115. There it rests and the container is thereby sealed.

Obviously the feeding of the containers into the recesses or openings 95 might be done by hand but I prefer to employ an automatic feeding device. The feeder E is such a device. It forms no part of our joint invention but constitutes the invention of Harley R. Phillips, one of the applicants herein. The feeder illustrated feeds the containers 43 from a stack stripping off the bottom container each time a recess 95 is presented for filling. The stacked containers are located in a holder or magazine 117 and fall by their own weight except as controlled by the screw 118. The holder 117 and screw 118 are mounted in a bracket 119 which is secured to the bracket 68 in any suitable way as by means of the screw bolts 120. The screw 118 is mounted on a short shaft 121 which is journaled in bearings in the walls 122 and 123 of the bracket 119. A wear plate 236 of harder metal than the bracket 119 constitutes a wearing surface for the under face of the screw 118. A key 124 cooperates with a key slot to connect the screw 118 with its shaft 121 so as to provide a slight longitudinal movement with respect to each other. The lower end of the short shaft 121 is provided with a clutch face 125 which cooperates with a clutch face 126 on the shaft 127. The latter is not capable of vertical adjustment, but is held against such adjustment in its bearings 123 and 128 by a collar 129 and the hub of a beveled gear wheel 130 both fixed to the shaft 127. By pulling upward on the short shaft 121 the clutch faces 125 and 126 may be moved out of engagement, and in consequence thereof rotation will not be communicated to the shaft 121 by the shaft 127. When it is desired to operatively connect the shaft 121 to the shaft 127, then the former is pushed downward and the clutch faces 125 and 126 are brought into engagement. The short shaft 121 is held in its uppermost position by frictional engagement with its upper bearing 122. Preferably the upper end of the shaft 121 is provided with a knurled head 131 in order to enable the same to be readily gripped between the finger and thumb when lifting the shaft 121 upward. The beveled gear wheel 130 meshes with a similar wheel 132 at the forward end of a horizontal shaft 133. The latter finds a bearing at one end in the bracket 119 and at the other end in a housing 134 which is secured to the side of the casing 20. The rear end of the shaft 133 has a beveled gear wheel 135 which meshes with a similar beveled gear wheel 136 fixed to one end of the cam shaft 35. It will be seen that the constantly driven cam shaft will cause the vertical shaft 127 to be constantly driven. It is only when the shaft 121 is moved out of clutching engagement with the shaft 127 that the feeding screw 118 is put out of service. The latter is provided with a thread 137 which has its convolutions spaced the right distance to cause the thread to engage between the rims 114 of the containers 43 as the same are related when in stacked position. It will be seen that when the cups 43 are in position in the holder 117 a number of the cups near the bottom of the stack will be engaged by the convolutions of the thread 137, and as the screw is rotated the lowermost cups will be positively carried downward. Finally when the lowermost cup reaches the lowermost convolution of the thread 137 it will be stripped from the cup above it and allowed to fall under the influence of gravity into the opening formed between the guard 96 and the recess 95 of the table D. The stripping action is brought about by giving the lowermost convolution of the thread an additional width so as to form a wedge 138 which comes into the space between the rims 114 of the two cups at the bottom of the stack, and by its wedging action strips the bottom cup from the cups above it. Upon each revolution of the screw 118 this stripping action takes place and one cup is deposited. The feed of the screw 118 bears such a relation to the movements of the conveying member D that a cup will be delivered by the feeder each time an opening presents itself. Likewise, the delivery will take place at a time early enough to allow the container to drop into its proper position in the recess of the table so as to be properly seated therein before the table begins its next advance movement. It will be noted that a portion of the lower end of the tubular holder 117 is cut away so as to allow the screw thread 137 to engage the rims 114 of the cups 43. This is shown more particularly in Fig. 6 at the points 139. Obviously, cups may be added to the stack in the holder 117 as desired. This will be done by passing them into the top of the holder.

It will be seen that the spacing of the recesses 95 is such that while one recess lies beneath the feeder during a rest period, another recess will occupy a position beneath the filling mechanism comprising the valve B and cylinders C. At the time a cup is in such filling position the valve B and cylinder pistons will be operated to deliver a charge of the commodity into the container beneath the valve. In the present instance two flavors may be simultaneously deposited in each container. Of course by filling both compartments of the hopper with the same commodity, each filling would consist of but one commodity, instead of two. While passing from the feeding position to the filling position the bottoms of the cups will travel upon the plate 93 which thus serves to support the same.

Finally after passing the filling position, the containers are brought to the capping or closure applying mechanism F. Here the closures which are, in the specific instance illustrated, caps, are applied. At the time this occurs the filled cup 43 occupies the space between the guard segments 96 and 97. In other words, at the capping position the guard does not engage the container but, as previously indicated, the clamping member 99 comes into play at this position to firmly clamp the filled container in the recess of the rotary table D. Clamping member 99 is provided with a curved outer face 140 which is adapted to firmly fit against the side of the container. It is also cut away at its sides so as to provide prongs 141 which enable it to pass into the recess 95 and with the recess to leave a circular opening just sufficient to firmly hold the container therein. The member 99 is mounted to slide upon a fixed support 142 suitably connected to the frame of the machine. The member 142 is slotted on its upper face for the reception of a tongue 143. The tongue and groove serve to guide the member 99 in a rectilinear direction as it is reciprocated. The upper side of the member 99 is provided with a guard 144 which has a flange at its upper end which extends slightly over the rim 114 of the container 43 when in clamped position and thus prevents withdrawal of the cup from its proper position upon withdrawal of the plunger 145 by which the cap 116 is forced into the cup 43. Obviously, when the clamping member 99 is withdrawn from clamping position the guard 144 does not interefere with the rim 114. The member 99 is reciprocated through a link 146 connected at one end to the member 99 by a pin 147, and at the other end to the outer end of a crank arm 148. The pin 147 has a central offset portion with which the link 146 engages. By this pin an accurate adjustment of the member 99 with reference to the link 146 may be obtained. The upper end of the pin 147 has a nut 149 fixed to it by means of a set screw 150. When it is desired to adjust the pin 147 a wrench may be used upon the nut 149 to rotate the pin. A set screw 151 engages a groove 152 in the lower portion of the pin 147. When the screw 151 is loosened a little the pin 147 may be readily turned and yet it cannot be withdrawn from the member 99. When the pin 147 has been given its proper adjustment the same may be maintained by tightening up the set screw 151. The crank arm 148 is a lateral extension from the upper end of a sleeve 153 which is mounted for rotation in a fixed bearing 154 carried by a shelf or plate 227 which forms a continuation of the forward bracket 68 of the machine. The plate 227 is positioned a little below the upper surface of the bracket 68, as clearly illustrated in Fig. 2. It may also be noted at this point that the support 142 for the reciprocating clamping member 99 is secured to this bearing 154, as clearly illustrated in Fig. 13. In this way the member 142 obtains its support from the frame of the machine.

The sleeve 153 is oscillated to and fro to rotate the crank arm 148 and thereby reciprocate the clamping member 99. Such oscillations are imparted through a gear wheel or segment 155 mounted on the outside of the sleeve 153, and a cooperating reciprocating tooth rack 156. The toothed segment 155 is connected to the sleeve 153 by a key 157 and consequently rotates with it. The toothed rack 156 is secured to an actuating arm 158 which cooperates with a cam member 159 keyed to the outer end of the cam shaft 35. On one side the member 159 is provided with a grooved cam track 160. A cam wheel 161 on the member 158 travels in the cam track 160. The member 158 is slotted at one end so as to embrace the shaft 35, the slot being designated 162. From this construction it will be seen that the rotation of the cam shaft 35 will impart a reciprocating movement to the member 158 and the latter through the toothed connection will oscillate the sleeve 153 to bring about reciprocations of the clamping member 99, as before pointed out. The cam track 160 upon the cam member 159 is positioned with reference to the other parts so that the clamping action will take place in proper timed relation with the movements of the table D and the plunger 145 of the closure applying mechanism F.

While the container is held in clamping position the mechanism F operates through the plunger 145 to apply a closure to the filled container in such position. For this purpose we employ a pneumatic cup 163 located at the lower end of the plunger 145. This cup reciprocates to and fro between supply and delivery positions. For giving the travel between these positions we utilize the sleeve 153 which is instrumental, as previously noted, in actuating the clamping member 99. Within the sleeve 153 there is a tube 164. This tube is free to move up and down within the sleeve 153 but is prevented from rotating therein. This result is accomplished by a key 165 which engages a key slot 166 in the tube 164. The upper end of the tube 164 carries an arm 167 and the plunger 145 is connected to the outer end of the arm 167 through a short tubular coupling 168. The opening 169 through the tube 164 communicates at one end with the vacuum line 113 and at the other end with an opening 170 through the arm 165, while the latter opening communicates with the pneumatic cup 163 through passages 171, 172, and 173. As soon as the mouth of the cup 163 is closed, the air within the cup is exhausted within said passages. As a result the article engaged by the cup is held by it until the vacuum is released. In operation this is accomplished by opening a valve 174 which controls a port 175 communicating with the passage 170.

Besides having the rotary movement between receiving and delivering positions, the cup 163 is moved vertically when in both of said positions. In the receiving position this is for the purpose of engaging a cap or other closure and lifting it free of the stack. In the delivering position this is for the purpose of placing the closure upon the container. In the present instance a cap 116 is forced down into the groove 115 of the container 43. In order to bring about these vertical movements of the cup 163, we provide upon the tube 164 a grooved collar 176. This collar is held in fixed relation to the tube by means of a ring 177 on one side and a nut 178 on the other. The groove 179 in the collar 176 is engaged by the prongs of a fork 180 on the end of a lever 181 which is pivoted at an intermediate point and carries a cam roller 182 which is kept in constant engagement with a cam face 183 on the cam member 159 by a tension spring 184 which is secured at one end to the lever 181 and at the other end to a fixed point such as the auxiliary casing 185 which encloses the end of the cam shaft 35, the cam member 159, and other associated parts. This auxiliary casing 185 is secured to the main casing 20 by any suitable means such as the bolts 186. The fixed end of the spring 184 is attached to the casing 185 by an adjustable member 187 which is in the form of a rod having an aperture at one end for the passage of the end of the spring, and nuts 188 at its other end for adjusting the position of the member 187 in accordance with the spring tension desired. The cam face 183 is irregular at opposite points and as the cam wheel 183 passes over these irregular portions the cup 163 is given its vertical movements. As before noted, one of these occurs at the cap receiving position and the other at the cap depositing position. The lever 181 has a central hub 237 from which the arms of the lever extend. This hub is mounted for oscillation on the stud shaft 238, shown more particularly in Fig. 14. The shaft 238 is mounted in a bearing 239 in the adjacent portion of the casing 20 and is held against rotation by a plurality of set screws 240. The shaft 238 is located within the auxiliary casing 185.

At the cap receiving position of the pneumatic cup 163 we provide a holder for holding a stack of closures which are to be conveyed one by one to close the filled containers in the aforesaid clamping position. The holder comprises a bracket casting 189 which is secured to the upper end of the bearing 154. For this purpose the casting is provided with a boss 189' which is bored out so as to fit over the upper end of the bearing or standard 154. A portion of the boss is split vertically and cooperating flanges are connected by bolts 190. In this way a clamping action is provided and the casting 189 is firmly held in place upon the standard 154. The bracket 189 is provided with an annular collar at its upper end into which a cylindrical head 191 is adapted to extend. This head is provided with ears 192 near its upper end and downwardly projecting rods 193 are secured to said ears and pass through threaded openings in horizontal portions of the bracket 189. This permits of a vertical adjustment of the ring 191 to suit the elevation of the pneumatic cup 163. The main portion of the holder comprises two segments 194 and 195 of a tube divided lengthwise practically throughout its length. The tubular segment 195 is secured at its upper end to the ring 191 and the inner face of the segment is flush with the inner face of the ring. The two parts may be soldered or otherwise secured. The lower end of the holder is provided with a collar or ring 196 to which it is also secured in any suitable way. The segment 194 is removable from the other part of the holder and at its lower end fits into the ring 196 while at its upper end it may be moved into position so that its inner surface is flush with the inner surface of the collar 191. Its lower end is guided into its position in ring 196 through the assistance of lugs 235 which extend upward and outward. Its upper end is held in proper position by means of a latch member 197 which is pivoted at 198 to a fixed part of the bracket 189 and is held in closed position by a pin 199 which engages the outside of the free end of the latch 197. The pin 199 passes through an opening in the bracket 189 just above the latch 197 so as to occupy the locking position illustrated in Fig. 10. The pin 199 is removable and when removed the latch member 197 may be rotated out of the way for the removal of the segment 194 of the holder. The latter segment is provided at its lower end with inturned lugs 200. When it is desired to place caps or like closures in the holder, all that is necessary is to remove the segment 194 from the holder and slip its lower end into the carton in which the stacked articles are located. As this is done the lugs 200 will pass down the side of the stack, but as soon as the segment 194 is withdrawn from the carton the lugs 200 will engage with one of the articles in the stack and as the segment is withdrawn it will carry with it all the articles in the stack above the one thus engaged. The same may then be placed in the holder by simply properly positioning the segment 194 within the ring 196 and locking it in place by the latch 197 and latch pin 199.

Since the downward movement of the pneumatic cup 163 is limited for each adjustment of the members cooperating with the cam face 183, it is necessary to provide for the feeding of the articles in the holder upward into position where the topmost one may be engaged by the cup 163 in the downward movement in the receiving position. For this purpose we provide two members 201 for engaging beneath a column of articles in the holder and moving them upward from time to time under the influence of one or more weights. The arrangements for moving both members 201 are alike. It will therefore suffice to describe one of these in detail. It will be noted that the segments 194 and 195 of the holder are spaced apart at diametrically opposite points and in this way two slots 202 are provided for the passage of the members 201. In operation, one member 201 is moved to a point beneath a column of the articles in the holder and through the action of this member the articles held by it are moved upward as they are removed by the cup 163 until the member 201 closely approaches the top of the holder. Then the attendant should remove the segment 194 and fill it with a new supply of articles and replace the segment with the articles upon it in the holder and when he has done this, take the other member 201 and slip it in between the articles well down in the stack and remove the uppermost member 201 so that from that time on the feeding will be done by the lowermost member. While the latter is in service, the other preferably is out of service and vice versa.

Each member 201 is preferably a light spring strip or blade which may be readily passed between caps or other articles in the stack. Each member is frictionally held in a holder or carrier 203 which is adapted to travel along a vertical rod 204. There are two such rods and they are passed at their lower ends through holes in the flanges 205 upon the ring 196. At their upper ends these rods extend through openings in and are secured to the main holder bracket 189. The rods 204 are slightly offset with reference to the slots 202 but the carriers 203 extend laterally from the rods in the direction of the slots far enough to permit the entry of the spring fingers 201 through the slots into the space within the holder. The spring fingers 201 and their carriers 203 are moved upward through the agency of flexible connections in the form of sprocket chains 206 which pass respectively over pulleys in the form of sprocket wheels 207, the free end of the chain in each instance being provided with a weight 208. When free each weight tends to move its chain 206 about its pulley 207 and thus raise the associated finger 201. Each sprocket wheel 207 is rotatable upon a horizontal shaft 209 journaled in the uprights of a bracket member 210 secured to the bracket 189 by any suitable means such as one or more screws 211.

In order to permit the weighted chain 206 to move its finger 201 upward only when the pneumatic cup 163 is directly above the holder and in position to engage the uppermost article in the stack, we provide catch mechanism which locks the chain 206 in each instance against movement except when the cup is in proper position. This catch mechanism is operated to release the chain in each instance by the movement of the cup itself. This mechanism comprises a ratchet wheel 212 secured to the hub of the sprocket wheel 207. A detent or retaining pawl 213 normally engages a tooth of the wheel 212 and the position of the same with reference to the teeth is such as to prevent the weight 208 from rotating the wheel 207 and therefore lifting the stack elevating finger 201. As clearly shown, two such ratchet wheels and detents are provided. Each detent 213 is mounted upon a lever 214 which is pivoted at its lower end to a portion of the bracket 210. Each lever 214 is provided with a horizontal extension 215. A coiled compression spring 216 bears in a socket 217 in the main bracket 189 and presses at its upper end against the under side of the extension 215, a recess 218 being provided on the under side of the extension 215 for the reception of the upper end of the spring. The action of this spring in each case is to shove the associated lever 214 forward so as to bring the pawl 213 into tooth engaging position. As before stated, the retaining mechanism serves to hold the wheel 207 and the chain 206 against movement. For the purpose of freeing the wheel 207 from the action of the ratchet mechanism in both cases, we provide means for rocking the upper ends of the levers 214 away from the ratchet wheels 212. For this purpose a shaft 219 is journaled in the innermost uprights of the bracket member 210. The short rock arm 220 is secured by a pin 221 to each end of the shaft 219. The rock arms 220 extend downward and when the shaft 219 is rotated counter-clockwise, as viewed in Fig. 9, each rock arm engages its lever 214 and the pawls 213 are thus freed from the ratchet wheels 212. The rock shaft 219 is provided at its center with an arm 222 which extends toward the plunger 145 which carries the pneumatic cup 163. A rigid arm 223 at the upper end of the plunger 145 is arranged to engage the outer end of the rock arm 222 as the plunger descends. The parts are so spaced that the cup 163 will reach the end of its lowermost movement about the time that the arm 223 engages the arm 222 to free the pawls 213 and thus leave chain 206 under the control of pneumatic cup and associated weight. It will be noted that the one rock arm 222 serves to release both chains. The effect of thus releasing these chains is to cause the weights to force the fingers 201 upward, with the result that the stack of articles above the fingers is carried upward. This upward movement is limited by the uppermost article of the stack engaging the cup 163. As soon as the cup begins to move upward the arms 222 and 223 move upward and the retaining pawls 213 are promptly moved into engagement with the teeth of the ratchet wheels 212 in response to the actuating springs 216. Thus it will be seen that the force which tends to raise the stack upward in the holder comes into play only when the pneumatic cup is in position to limit that movement. As soon as the cup begins to move away so that it can not perform such function, the uplifting force is removed. From what has been previously stated, it will be clear that each elevating finger 201 will act upon all those articles in the holder above it. With the fingers 201 spaced apart the uppermost will apply force to the articles above it, and the lowermost will apply a force to both the articles which are under its sole control and also those carried by the uppermost finger. Of course if desired one finger might be withdrawn from the holder and left in inoperative position.

In the event that one weight 208 upon each of the chains 206 will not apply enough force when the associated fingers 201 are placed near the bottom of the holder and are consequently heavily loaded, then we provide for each chain an auxiliary weight 224, which is arranged to be engaged by the associated weight 208 as it moves upward and to be freed therefrom as the weight 208 moves downward. For this purpose each weight 224 is provided with a central opening 225 through which the chain 206 is adapted to freely pass. Furthermore, each weight 224 is provided with a recess or pocket 226 on its under side into which the upper end of weight 208 is adapted to fit. Normally, each weight 224 rests on the plate 227. This plate occupies a position at an intermediate point in the travel of the weight 208. In each instance as the weight 208 moves upward past the plate 227 it engages and carries with it the weight 224 and thus increases the total weight applied to the chain 206. Obviously, this will occur when the fingers 201 are near the bottom of the holder. The plate 227 is in each case provided with an aperture large enough to allow for the free passage of the weight 208, but the opening is easily bridged by the weight 224 when it rests upon the plate.

It will be clear that in the operation of the pneumatic capping mechanism F the pneumatic cup 163 will have the air exhausted from it at the time it comes into engagement with the flat surface of the uppermost cap or article in the holder. The effect of this withdrawal of pressure from the upper side of the cap will be to retain it upon the cup as the latter is raised from this receiving position and moved to the capping position illustrated more particularly in Fig. 13. Indeed, the cap will remain in engagement with the cup and be retained by it until the vacuum is released by the operation of the valve 174. This will occur only after the cup has been rotated to the capping position and been lowered far enough to bring about a successful capping operation. As clearly shown, the valve 174 is provided upon the arm 167 and has an overhanging end. As the plunger 145 and arm 167 move downward, the outer end of the valve 174 engages a yielding stop 228 mounted at the end of a bracket arm 229 suitably secured to the upper end of a plate 230 bolted to the bracket 142. The arm 229 is adjustably secured to the plate 230, slots 231 in the member 229 and associated bolts having thumb nuts 232 being provided for this purpose. The stop pin 228 extends through a tubular opening in the end of the arm 229 and a coiled compression spring 233 acts between the under face of the head of the pin 228 and the adjacent portion of the arm 229 to normally hold the stop 228 in its uppermost position. A transverse pin 234 extending through the lower end of the stop pin 228 prevents its being forced out of engagement with the arm 229 by the spring 233. As soon as the valve 274 is opened the vacuum in the cup 163 is destroyed and the cap will then be released, but the action of the plunger is free to force it into the resilient open end of the container 43 and thus bring it into final closing position, thereby sealing the container and its contents.

In operation the containers are dropped one by one by the feeding mechanism E into the recesses provided in the rotary table D, and the latter carries them successively to the filling position below the valve B. Two steps are required to carry a particular container from the feeder E to the filling position. A subsequent step brings the filled container to the capping position where the clamping member 99 firmly holds the filled container while the mechanism F applies the closure. After two more steps the filled and sealed container is free to pass on to the table G. Three positions allow for the filled container to free itself from the rotary table D. From the table G the attendant removes the filled and closed containers and they are then taken to a hardening room where the balance of the freezing takes place, in case the machine is used in packaging a frozen commodity. Where this is not the case, the packages may be removed from the table G and promptly packed for shipment.

In carrying out our invention, obviously many alterations and modifications may be made in the particular structures illustrated without departing from the spirit and scope of the invention. The articles operated upon by the pneumatic capping mechanism may be quite different than the caps illustrated. In such case it may be necessary to modify the mouth of the cup 163 so as to fit the articles being handled and thus insure a proper vacuum for the lifting of the same from the stack. Other alterations and modifications may be suggested to the mind of the worker in this art without departing from the spirit and scope of the invention. We, therefore, do not wish to be limited to the exact constructions shown, but aim to cover all these alterations and modifications, which rightly come within the scope and purview of the invention, by the terms of the appended claims.

What we claim as new and desire to secure by a patent of the United States is:

1. In combination, a holder for a column of stacked articles, a movable pneumatic cup for engaging the topmost article to seize it and remove it, a member for engaging beneath a number of stacked articles in said holder, a sprocket pulley, a weight, a sprocket chain over said pulley connecting said member and weight, said weight when free being operative to raise said member, a ratchet wheel rotatable with said pulley, a pivoted catch for engaging the teeth of said wheel to lock the same against movement by said weight, lever mechanism operated by the downward travel of said cup to free said catch, and a spring for returning said catch to locking position when said lever mechanism is unrestrained by said cup.

2. In combination, a support, a holder for a column of stacked articles, said holder comprising two segments of a tube divided lengthwise, one segment being secured to said support, the other segment having lugs at its lower end whereby it may be slipped into a carton of stacked articles and withdrawn with the articles upon it in stacked relation, and means for securing the segments together to complete the holder.

3. In combination, a support, a holder for a column of stacked articles, said holder comprising two segments of a tube divided lengthwise, one segment being secured to said support, the other segment having lugs at its lower end whereby it may be slipped into a carton of stacked articles and withdrawn with the articles upon it in stacked relation, a socket ring at the lower end of said first mentioned segment into which the other segment is adapted to be slipped when filled with the withdrawn articles, and means at the top of said first mentioned segment for retaining the other segment in associated relation.

4. In a machine of the class described, a rotary step by step conveying member having spaced peripheral recesses for engaging the sides of containers therein, fixed peripheral members for engaging the sides and bottoms of containers in said recesses to retain the same in place as they are advanced by said member to a closure applying position, a vertical holder adjacent to said position adapted to hold a stack of closures for the containers, a pneumatic cup for transporting the closures, means for shifting said cup to and fro between said stack and closure applying position and causing said cup in the former position to engage the end closure of the stack and in the latter position to press it home upon the container in said closure applying position, pneumatic means cooperating with said cup to seize the end closure when engaged by said cup in the former position and to release said closure when brought by said cup to the latter position, a slidable clamping member at said closure applying position movable toward and from the center of said conveying member into and out of cooperating clamping relation with the walls of the opposing recess to clamp and free a container at that position, and means actuated by said shifting means to move said clamping member into and out of said clamping relation as said pneumatic cup moves into and out of closure applying position respectively.

5. In a machine of the class described; a rotary step by step conveying member having peripheral recesses provided with walls against which containers in the recesses may be clamped; a radially movable cooperating clamping member; a vertical holder for closures for the containers; a pneumatic cup for conveying closures; a movable support for said cup having suitable suction connections; means for raising and lowering said support; means for rotating said support when elevated; means actuated by said rotating means to actuate said movable clamping member; means for controlling the application of suction to said cup; a power shaft; and means actuated by said shaft to operate said cup support, said raising and lowering means, said rotating means and through said support said suction applying means, all in timed relation to cause said cup to seize and convey closures and apply them to clamped containers.

6. In combination, a holder for a column of stacked articles, an upper member vertically movable into and out of engagement with the topmost article, a lower member for engaging beneath a number of stacked articles in said holder, a sprocket pulley, a weight, a sprocket chain over said pulley connecting said lower member and weight, said weight when free being operative to raise said lower member, a ratchet wheel rotatable with said pulley, a pivoted catch for engaging the teeth of said wheel to lock the same against movement by said weight, lever mechanism operated by the downward travel of said upper member to free said catch, and a spring for returning said catch to locking position when said lever mechanism is unrestrained by said upper member.

7. In combination, a holder for a column of stacked articles, a member for engaging the topmost article in the stack, a plurality of thin supporting members each readily insertable at will between articles at any desired point in the stack to support articles in the stack above said supporting member, said holder being operable to hold the column of stacked articles when all of said supporting members are withdrawn from the stack, weighted means associated with each said supporting member to cause it to press upward upon the articles above it, and means for preventing the application of said pressure except when said engaging member is above and in line with the column.

8. In combination, a support, a holder for a column of stacked articles, said holder comprising two segments of a tube divided lengthwise, one segment being secured to said support, the other segment having lugs at its lower end for cooperation in holding a column of stacked articles on said segment, means for securing the segments together to complete the holder, two longitudianl slots being provided at the meeting edges of said segments, a member near the top of said holder for engaging the topmost article in the column, two thin supporting members associated respectively with said slots and each readily insertable by hand at will through its slot between articles in said holder at any desired point to support the articles above said supporting member, and means for causing each of said supporting members to exert an upward pressure upon articles above it whenever said engaging member is above and in line with said column of articles.

9. In combination, a support, a holder for a column of stacked articles, said holder comprising two segments of a tube divided lengthwise, one segment being secured to said support, the other segment having lugs at its lower end for cooperating in holding a column of stacked articles on said segment, a socket ring at the lower end of said first mentioned segment into which the lower end of the other segment is adapted to be slipped when holding a column of stacked articles, means at the top of said first segment for retaining the other segment in associated relation, two longitudinal slots being provided at the meeting edges of said segments, vertical rods extending near said slots between said support and said socket ring, blade holders adapted to travel along said rods, blades carried by said blade holders and adjustable therein to be inserted by hand at will through said slots between articles in said holder, each at any desired point in the height of the stack or articles, means for causing each of said blades to press upward upon articles above it, and means for controlling the action of said causing means.

10. In combination, a vertical holder for a column of stacked articles, a plurality of supporting blades movable into and out of said holder at different points in the height of said column to engage beneath different portions of said column, means for causing said blades to press upward, means for engaging the topmost article as said upward pressure is applied to all of said blades, means for removing said engaging means out of engagement with the topmost article, and means for simultaneously therewith locking said blades against movement.

11. In combination, a vertical holder for a column of stacked articles, a pneumatic cup for engaging the topmost article in said column, means for causing said cup to periodically seize and remove said topmost article, a plurality of supporting blades movable into and out of said holder, vertically movable carriers for said blades, said blades when projected into said holder at different heights serving to support different portions of said column, means operative to draw upward on said carriers whenever said cup is in position to engage the topmost article of the column, and means for locking said drawing means against operation while said cup is out of position to engage said topmost article.

12. In combination, a holder for a column of stacked articles, a movable pneumatic cup for engaging the topmost article to seize it and remove it, a plurality of thin supporting members adapted to be independently moved by hand lengthwise of said holder into desired positions different distances from the top of the column and there to be slipped between articles in the stack, weighted means associated with each said member to cause it to apply an upward force against the column of articles above it, and means for preventing the application of said force except when said cup is in line with the column.

13. In combination, a holder for a column of stacked articles, a movable penumatic cup for engaging the topmost article to seize it and remove it, a thin supporting member adapted to be moved by hand lengthwise of said holder into desired positions different distances from the top of the column and there to be slipped between articles in the stack, weighted means associated with said member to cause it to apply an upward force against the column of articles above it, and means for preventing the application of said force except when said cup is in line with the column.

14. In combination, a holder for a column of stacked articles, a movable pneumatic cup for engaging the topmost article to seize it and remove it, a plurality of thin supporting members adapted to be independently moved by hand lengthwise of said holder into desired positions different distances from the top of the column and there to be slipped between articles in the stack, a pulley for each member, a flexible connection connected to each said member and passing over its pulley, a weight on each said flexible connection pulling on the same to raise its member and the articles carried by it, and means for preventing the application of the forces of said weights except when said cup is in line with the column of articles.

15. In combination, a holder for a column of stacked articles, a movable pneumatic cup for engaging the topmost article to seize it and remove it, a thin supporting member adapted to be moved by hand lengthwise of said holder into desired positions different distances from the top of the column and there to be slipped between articles in the stack, a pulley for said member, a flexible connection connected to said member and passing over said pulley, a weight on said flexible connection pulling the same to raise said member and the articles carried by it, and means for preventing the application of the force of said weight except when said cup is in line with the column of articles.

16. In combination, a holder for a column of stacked articles, a movable pneumatic cup for engaging the topmost article to seize it and remove it, a plurality of thin supporting members adapted to be independently moved by hand lengthwise of said holder into desired positions different distances from the top of the column and there to be slipped between articles in the stack, means associated with each said member to cause it to apply an upward force against the column of articles above it, and means for preventing the application of said force except when said cup is in line with the column.

17. In combination, a holder for a column of stacked articles, a movable pneumatic cup for engaging the topmost article to seize it and remove it, a thin supporting member adapted to be moved by hand lengthwise of said holder into desired positions different distances from the top of the column and there to be slipped between articles in the stack, means associated with said member to cause it to apply an upward force against the column of articles above it, and means for preventing the application of said force except when said cup is in line with the column.

18. In combination, a holder for a column of stacked articles, a movable pneumatic cup for engaging the topmost article to seize it and remove it, guiding means extending lengthwise of said holder, carriers movable along said guiding means to desired positions different distances from the top of said holder, a thin supporting member on each carrier movable transversely of the axis of said holder into and out of the body of the stack, and means for causing said thin supporting members to exert an upward pressure in each case upon the column of articles supported by it only when said cup is in position to engage the topmost article of the column.

19. In combination, a holder for a column of stacked articles, a movable pneumatic cup for engaging the topmost article to seize it and remove it, guiding means extending lengthwise of said holder, a carrier movable along said guiding means to desired positions different distances from the top of said holder, a thin supporting member on said carrier movable transversely of the axis of said holder into and out of the body of the stack, and means for causing said thin supporting member to exert an upward pressure upon the column of articles supported by it only when said cup is in position to engage the topmost article of the column.

20. In combination, a holder for a column of stacked articles, a movable pneumatic cup for engaging the topmost article to seize it and remove it, carriers, means whereby said carriers may be moved lengthwise of said holder to various positions differently distanced from the top of said holder, a thin supporting member on each carrier movable transversely of the axis of said holder into and out of the body of the stack, and means for causing said thin supporting members to exert upward pressure in each case upon the column of articles supported by it only when said cup is in position to engage the topmost article of the column.

21. In combination, a holder for a column of stacked articles, a movable pneumatic cup for engaging the topmost article to seize it and remove it, a carrier, means whereby said carrier may be moved lengthwise of said holder to various positions differently distanced from the top of said holder, a thin supporting member on said carrier movable transversely of the axis of said holder into and out of the body of the stack, and means for causing said thin supporting member to exert an upward pressure upon the column of articles supported by it only when said cup is in position to engage the topmost article of the column.

22. In combination, a holder for a column of stacked articles, a member for engaging the topmost article in the stack, a plurality of carriers, movable supporting means for said carriers by which said carriers may be severally positioned at will at desired points along said holder, a thin article-supporting member for insertion between articles in the stack movably mounted on each said carrier to pass into and out of the stack in a direction transverse to the axis of said holder, and means for causing said thin supporting members to exert an upward pressure in each case upon the articles supported above it but only when said engaging member is in position to engage the topmost article of the column.

23. In combination, a holder for a column of stacked articles, a member for engaging the topmost article in the stack, a carrier, movable supporting means for said carrier by which said carrier may be positioned at will at desired points along said holder, a thin article supporting member for insertion between articles in the stack movably mounted on said carrier to pass into and out of the stack in a direction transverse to the axis of said holder, and means for causing said thin supporting member to exert an upward pressure in each case upon the articles supported above it but only when said engaging member is in position to engage the topmost article of the column.

24. In combination, a vertical holder for a column of stacked articles, a plurality of blade carriers, movable supporting means for said carriers extending lengthwise of said holder whereby said carriers may be placed at desired heights along said holder, horizontal blades secured to said carriers and movable into and out of the holder to supportingly engage different numbers of articles in the stack, means for causing said blades to press upward independently of each other, and means for engaging the topmost article as said pressure is applied by all said blades.

25. In combination, a vertical holder for a column of stacked articles, a blade carrier, movable supporting means for said carrier extending lengthwise of said holder whereby said carrier may be placed at desired heights along said holder, a horizontal blade secured to said carrier and movable into and out of the holder to supportingly engage different numbers of articles in the stack, means for causing said blade to press upward, and means for engaging the topmost article as said pressure is applied by said blade.

26. In combination, a holder for a column of stacked articles, a member for engaging the topmost article in the stack, a thin supporting member readily insertible at will between articles at any desired point in the stack to support articles in the stack above said supporting member, said holder being operable to hold the column of stacked articles when said supporting member is withdrawn from the stack, weighted means associated with said supporting member to cause it to press upward upon the articles above it, and means for preventing the application of said pressure except when said engaging member is above and in line with the column.

27. In combination, a support, a holder for a column of stacked articles, said holder comprising two segments of a tube divided lengthwise, one segment being secured to said support, the other segment having lugs at its lower end for cooperation in holding a column of stacked articles on said segment, means for securing the segments together to complete the holder, a longitudinal slot being provided at meeting edges of said segments, a member near the top of said holder for engaging the topmost article in the column, a thin supporting member associated with said slot and readily insertible by hand at will through said slot between articles in said holder at any desired point to support the articles above said supporting member, and means for causing said supporting member to exert an upward pressure upon articles above it whenever said engaging member is above and in line with said column of articles.

28. In combination, a support, a holder for a column of stacked articles, said holder comprising two segments of a tube divided lengthwise, one segment being secured to said support, the other segment having lugs at its lower end for cooperating in holding a column of stacked articles on said segment, a socket ring at the lower end of said first mentioned segment into which the lower end of the other segment is adapted to be slipped when holding a column of stacked articles, means at the top of said first segment for retaining the other segment in associated relation, a longitudinal slot being provided at meeting edges of said segment, a vertical rod extending near said slot between said support and said socket ring, a blade holder adapted to travel along said rod, a blade carried by said holder and adjustable therein to be inserted by hand at will through said slot between articles in said holder at any desired point in the height of the stack of articles, means for causing said blade to press upward upon articles above it, and means for controlling the action of said causing means.

29. In combination, a vertical holder for a column of stacked articles, a supporting blade movable into and out of said holder at different points in the height of said column to engage beneath different portions of said column, means for causing said blade to press upward, means for engaging the topmost article as said upward pressure is applied to said blade, means for removing said engaging means out of engagement with the topmost article, and means for simultaneously therewith locking said blade against movement.

30. In combination, a vertical holder for a column of stacked articles, a pneumatic cup for engaging the topmost article in said columns, means for causing said cup to periodically seize and remove said topmost article, a supporting blade movable into and out of said holder, a vertical movable carrier for said blade, said blade when projected into said holder at different heights serving to support different portions of said column, means operative to draw upward on said carrier whenever said cup is in position to engage the topmost article of the column, and means for locking said drawing means against operation while said cup is out of position to engage said topmost article.

In witness whereof, we have hereunto affixed our signatures this 28th day of July, 1926.

J. J. MOJONNIER.
HARLEY R. PHILLIPS.
HENRY J. CLARKE.